United States Patent
Enrietti

(10) Patent No.: US 7,670,533 B2
(45) Date of Patent: Mar. 2, 2010

(54) SWITCH FOR THE FLOW OF MOLTEN PLASTICS MATERIAL IN A HOT PLATE FOR INJECTION MOULDING

(75) Inventor: Piero Enrietti, Donnas (IT)

(73) Assignee: Thermoplay S.p.A., Point Saint Martin (IT)

( * ) Notice: Subject to any disclaimer, the term of this patent is extended or adjusted under 35 U.S.C. 154(b) by 226 days.

(21) Appl. No.: 12/066,023

(22) PCT Filed: Sep. 6, 2006

(86) PCT No.: PCT/IB2006/053131

§ 371 (c)(1),
(2), (4) Date: Mar. 6, 2008

(87) PCT Pub. No.: WO2007/029184

PCT Pub. Date: Mar. 15, 2007

(65) Prior Publication Data

US 2008/0251970 A1      Oct. 16, 2008

(30) Foreign Application Priority Data

Sep. 9, 2005   (IT) .......................... TO2005A0611

(51) Int. Cl.
*B29C 45/27* (2006.01)
*B29C 45/72* (2006.01)

(52) U.S. Cl. ..................................... 264/319; 425/549
(58) Field of Classification Search ................. 264/319; 425/549, 182–195
See application file for complete search history.

(56) References Cited

U.S. PATENT DOCUMENTS

| 4,747,770 | A | * | 5/1988 | Schmidt | 425/549 |
| 4,755,131 | A | * | 7/1988 | Schmidt | 425/549 |
| 6,162,043 | A | * | 12/2000 | Gellert | 425/549 |

FOREIGN PATENT DOCUMENTS

| DE | 10307616 A1 | 9/2004 |
| DE | 10325568 A1 | 2/2005 |

* cited by examiner

*Primary Examiner*—Jill L Heitbrink
(74) *Attorney, Agent, or Firm*—Banner & Witcoff, Ltd.

(57) ABSTRACT

A cylindrical switch has one or more passages which open onto a lateral cylindrical surface of the switch. The switch is capable of being tightly received in a cylindrical hole in a hot plate and of being selectively orientated so that the passages are angularly in line with or offset from two or more channels in the hot plate which open onto the hole in order to selectively permit, interrupt or divert the flow of molten plastics material between the aforesaid channels. The switch incorporates a circuit for a cooling fluid.

6 Claims, 5 Drawing Sheets

SWITCH FOR THE FLOW OF MOLTEN PLASTICS MATERIAL IN A HOT PLATE FOR INJECTION MOULDING

This application is a national stage application of co-pending PCT application PCT/IB2006/053131 filed on Sep. 6, 2006, which was published Under PCT Article 21(2) in English, and of Application No. TO2005A000611 filed in Italy on Sep. 9, 2005, which is incorporated by reference herein in its entirety.

This invention relates to a switch for the flow of molten plastics material in a hot plate for injection moulding.

In machines for injection moulding, the molten plastics material is distributed to various injection nozzles from one or more external injection outlets through a network of channels (known as hot channels) formed in a distribution plate (hot plate) which is mounted above the mould and connected to the injection nozzles.

For various reasons it is from time to time necessary to open or close a hot channel to interrupt or restore the flow of molten plastics material to a particular nozzle or group of nozzles, or to selectively divert the flow of plastics material towards particular nozzles, excluding others. In other cases, when a hot plate is designed to be connected to several injection openings it is from time to time necessary to selectively open and close particular hot channels to feed the nozzles through one injection opening instead of another.

For this purpose, in a hot plate a cylindrical switch which is inserted with a forced interference fit into a cylindrical hole into which two or more channels which are placed in communication or closed depending upon the angular position in which the switch is set. The switch has one or more internal or peripheral passages with corresponding openings located on the lateral cylindrical surface which, depending upon the angular position of the switch, line up with the channels to establish fluid communication between two channels, or are angularly offset to prevent the passage of plastics material from one channel to another.

A perfectly leaktight seal is needed between the switch and the hot plate. When it is considered that the molten plastics material in the hot channels is at pressures of the order of 1000-1500 bar, even minimum play (of the order of 2-3/100 mm) between the hot plate and the switch can give rise to the leakage of plastics material, which must absolutely be avoided.

When it is necessary to change or vary the connections between the channels opening into the hole, the mould must be removed from the moulding press, various electrical and hydraulic or pneumatic connections for operating the plugs for the injection nozzles must be disconnected, the heavy hot plate must be lifted using a hoist, and then the switch must be removed from the hot plate and then forcibly reinserted in the desired new angular position. Before the mould is reassembled, any interface surfaces which may have been soiled by plastics material must be cleaned again.

On average the abovementioned operations require almost two working days. While the machine is being reassembled it sometimes happens that some electrical and/or hydrodynamic connections are not correctly restored, as a result of which the injection machine downtime is further increased. In addition to this, it will be noted that the abovementioned operations require action by specialist labour, as a result of which the user must sometimes transfer the hot plate to the manufacturer.

BRIEF SUMMARY OF THE INVENTION

This invention relates to a switch for the flow of molten plastics material in a hot plate for injection moulding.

A primary object of the invention is to perform the abovementioned switching operations in a short time without having to dismantle the mould from the injection machine.

Another object of the invention is to provide a seal which is perfectly leaktight for the high pressure molten plastics which flows in the hot channels during the moulding operations.

These and other objects and advantages which will be better understood below are achieved through a switch having the characteristics specified in claim 1. In accordance with another aspect of the invention these objects are achieved through a method according to claim 4. Preferred embodiments of the invention are defined in the dependent claims.

BRIEF DESCRIPTION OF THE DRAWINGS

The features and advantages of the invention will appear from the detailed description of an embodiment thereof, given by way of example and referring to the attached drawings, in which.

DESCRIPTION

Figure 1:
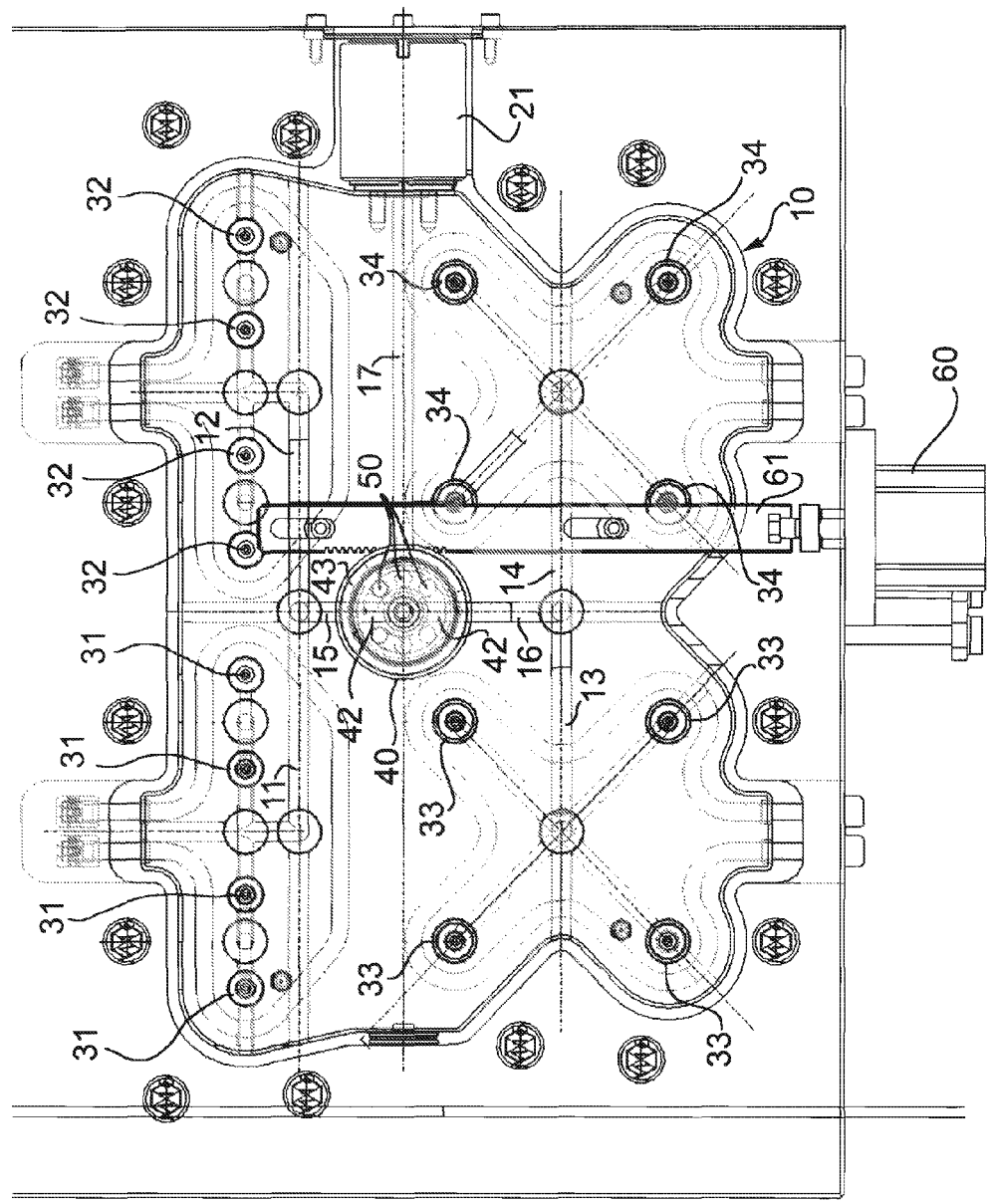
FIGS. 1 and 2 are a plan view from above and an exploded perspective view, respectively, of a hot plate with a switch according to the invention, two injection openings and 16 injector nozzles.
Figure 2:
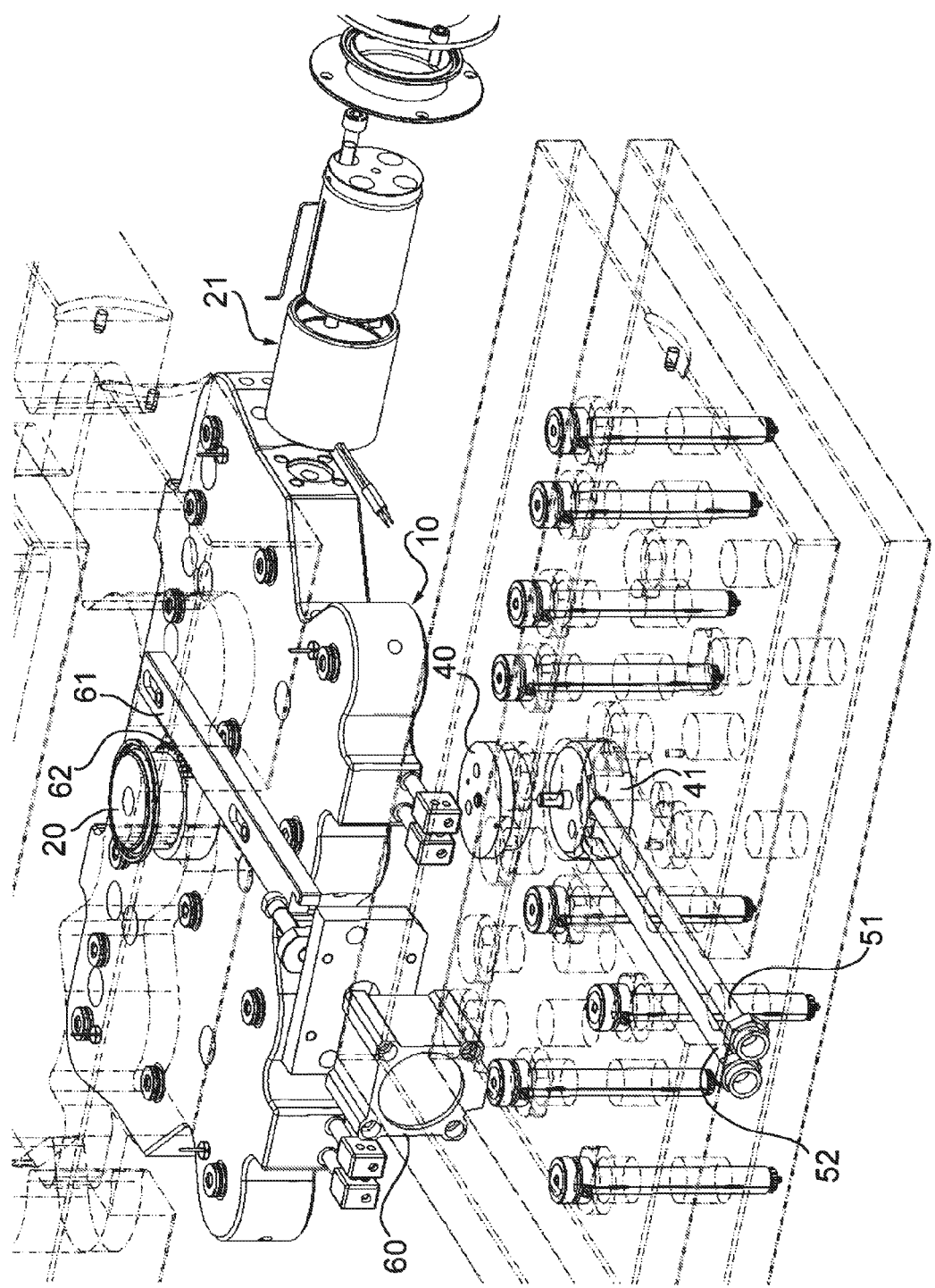

With reference initially to FIGS. 1 and 2, 10 indicates a distribution plate (or hot plate) which forms a network of channels (or hot channels) 11-17 to distribute the molten high pressure plastics material from two injection bushings 20, 21 to sixteen injection nozzles subdivided into four groups 31, 32, 33, 34. The nozzles in groups 31 and 32 are fed with molten plastics material through branches 11, 12 of a hot channel 15, while the nozzles in groups 33 and 34 are fed from branches 13, 14 of a hot channel 16. Hot channels 15 and 16 can receive the molten plastics material from injection bushings 20 or 21 alternately, typically to inject two different plastics materials. 17 indicates a hot channel for feeding plastics material originating from injection bushing 21.

Figure 3:
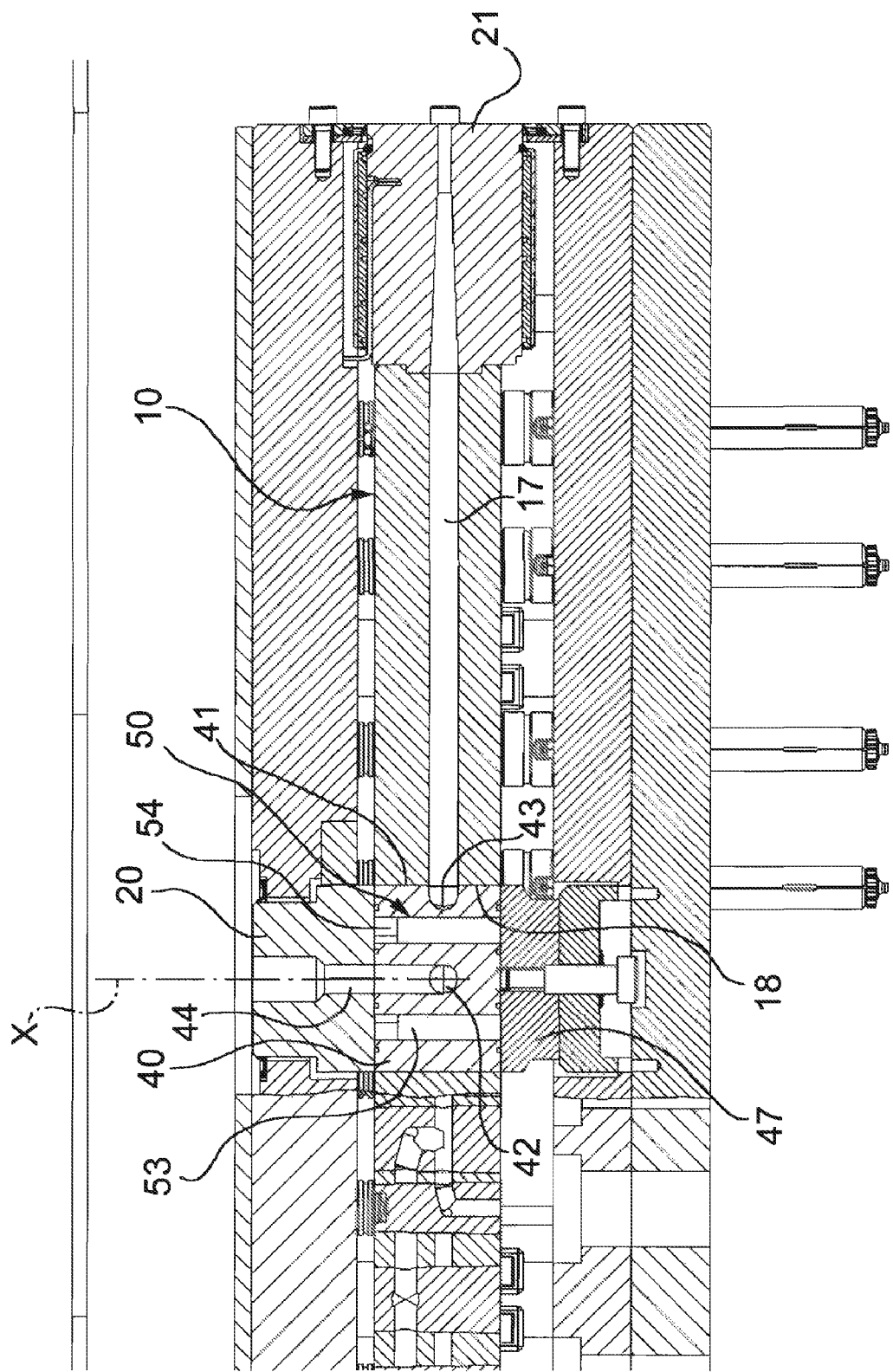
FIG. 3 is a view in vertical cross-section along the line III-III in FIG. 1.
Figure 4:
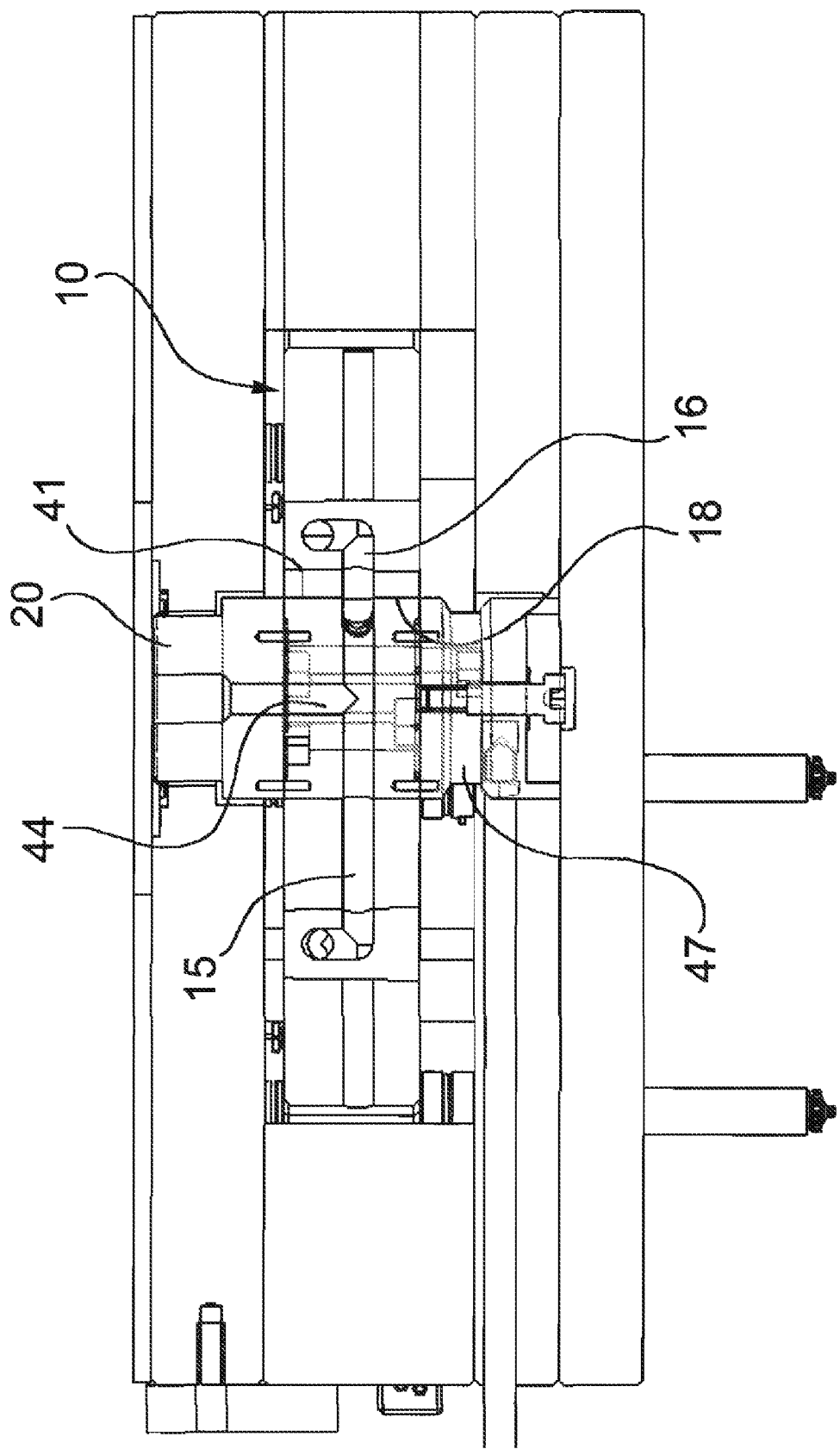
FIG. 4 is a view in vertical cross-section similar to that in FIG. 1, but with the switch orientated in a different angular position.

Hot channels 15, 16 and 17 open onto a cylindrical hole (18 (FIGS. 3 and 4) having a central axis which is vertical or perpendicular to hot plate 10. In the embodiment illustrated in the drawings, hot channels 15-17 are arranged in a T-shape in a horizontal plane.

In all this description and the claims which follow the terms and expressions indicating positions and orientations are to be understood to refer to the main (horizontal) plane of the hot plate. Thus, the term "vertical" indicates a direction perpendicular to the hot plate, and the term "transverse" indicates a direction perpendicular to the x axis.

A switch 40 is inserted in hole 18 in the manner described herein after. By varying the angular position of switch 40 hot channels 15, 16 can be alternately connected to or disconnected from one or other of injection bushings 20, 21 depending upon which bushing it is desired to use and which group of nozzles it is desired to inject with.

The switch 40 has a generally cylindrical shape with a lateral cylindrical wall 41 which almost matches that of hole 18, but of slightly greater diameter.

In the embodiment in FIGS. 1-4 the switch 40 forms two passages: an inner passage 42 and a peripheral passage 43 in the form of a groove which extends along a limited arc of the circumference of the switch.

The inner passage 42, in this embodiment a straight transverse passage, has opposing openings on the lateral cylindrical surface 41 and receives the plastics material delivered from above by bushing 20 through a central vertical passage 44. When the switch 40 is in the angular position illustrated in FIG. 4, the inner transverse passage 42 is in line with the hot channels 15 and 16 to establish a fluid communication between these and the upper bushing 20. In angular positions which are offset with respect to that in FIG. 4 the opposite openings of the transverse channel 42 are closed off by the wall of hole 18. When the switch is in the angular position illustrated in FIG. 3, the groove or peripheral passage places channel 17 in communication with one or both of channels 15, 16.

Notwithstanding the fact that this invention was initially conceived for hot plates which can be connected to more than one injection bushing for moulding in a multiple moulding press (as in the example illustrated), the reference to this possible field of application should not in any way be interpreted as restricting the scope of the patent. The invention may also be applied to hot plates having a single injection bushing and any number of injection nozzles. Likewise, the switch may have different numbers and shapes of passages, for example a single internal straight transverse passage to connect to or disconnect from two hot channels located at 180° with respect to each other, or it may have a passage with T or Y-shaped branches, or yet other shapes, and may therefore act merely as a member for selectively closing off and/or diverting flows of plastics material from one length of channel to another.

Figure 5:
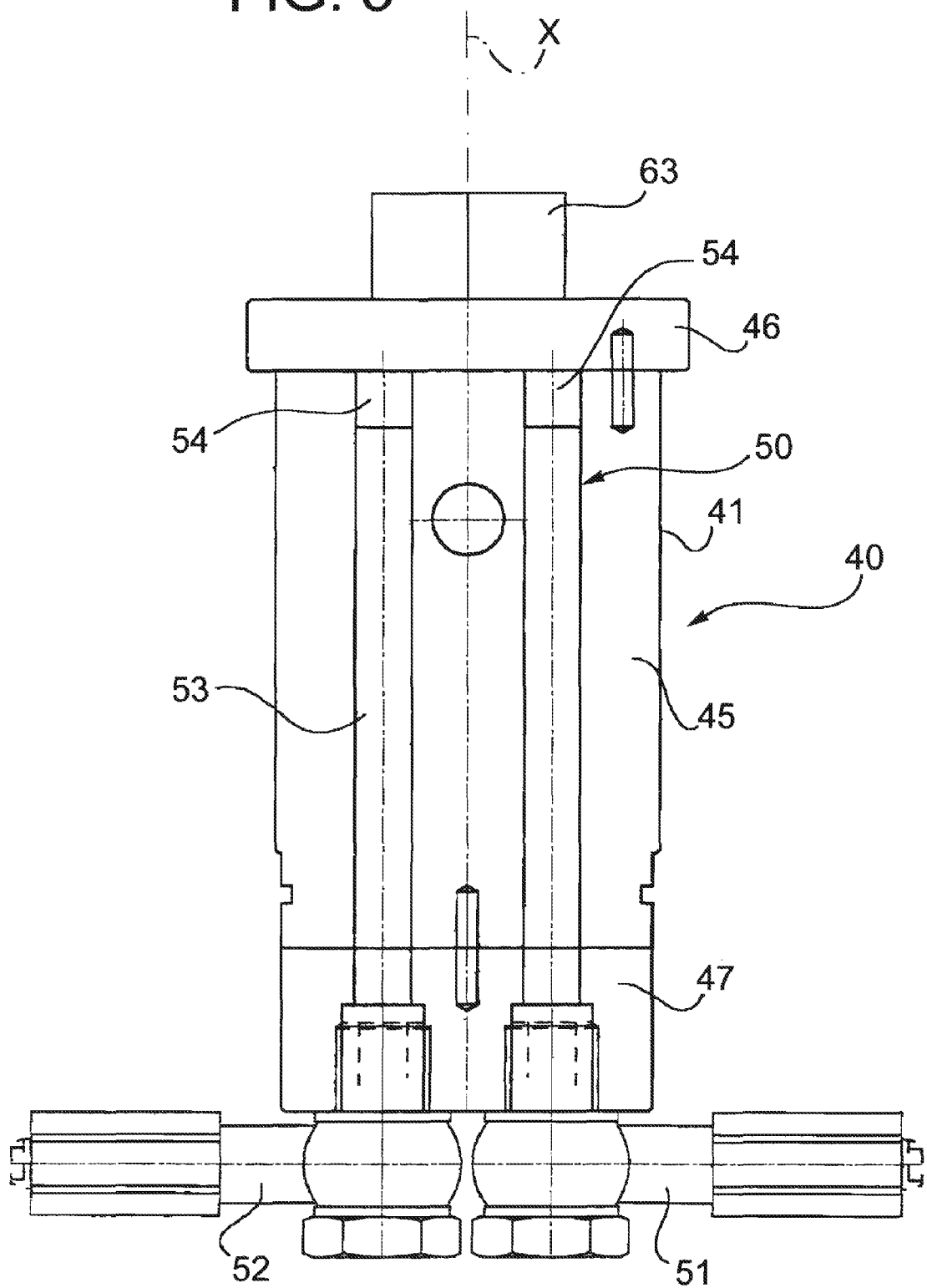
FIG. 5 is a view in vertical cross-section of another embodiment of a switch according to the invention.

In the embodiment illustrated in the drawings (see in particular FIG. 5), the switch comprises a main cylindrical body 45 rigidly fixed to an upper plate 46 and a lower plate 47. A coil cooling circuit 50 for the passage of a cooling fluid which is delivered through a delivery connection 51 and exits via an exit connection 52 connected to lower plate 47 is formed in main body 45. The cooling circuit 50 comprises a succession of parallel vertical lengths 53 joined by upper lengths 54 and lower lengths (not illustrated) which are closed off respectively by terminal plates 46 and 47. In the example in FIGS. 1-4 it is the body of the bushing 20 which closes off the circuit 50 at the top.

The switch is dimensioned in such a way that the outside diameter of the cylindrical surface 41, measured when cold, is slightly greater than the diameter of hole 18. For example, if the hole diameter is 54.00 mm, the external diameter of the switch will be $54+5/100$ mm. In this way there is cold radial interference between the switch 40 and the hole 18.

In order to insert the switch in the hole, the hot plate 10 is heated by activating electrical resistors (not illustrated) incorporated in the plate itself to cause expansion of hole 18 such that the switch 40 can be easily inserted into it. For example, if the hot plate is heated to a temperature of approximately 250° C., the diameter of the hole becomes $54+17/100$ mm. If the hot plate is then allowed to cool, the hole 18 contracts and the switch 40 remains firmly secured through radial interference. In other words the switch is shrunk-on into the hot plate. The radial interference between the switch 40 and the hole 18 is such as to ensure a seal which is leaktight for the high pressure molten plastics material which fills the hot channels when the injection machine is in operation. The switch remains immobilised in the same angular position even when the hot plate and the switch are heated during use.

When it is necessary to change the connections between the hot channels opening into hole 18, a cooling fluid (for example water) is caused to circulate in circuit 50. The plate 10 is instead kept hot. The switch contracts, acquires slight radial play with respect to the wall of the hole 18 and can be rotated about the X axis to a new desired angular position lining up or offsetting passages 42, 43 with respect to the hot channels 15, 16, 17 depending upon whether it is necessary to stop or restore or divert the flow between the channels, or feed the nozzles from one injection bushing or another.

Once the new desired angular position of the switch has been reached, the circulation of cooling fluid is interrupted and the switch expands thermally thus becoming immobilised through radial interference in the new angular position reached in the hole 18.

The switch may be rotated either manually or through an actuator, for example a hydraulic or pneumatic or electrical actuator, acting on a terminal part of the switch. In the example in FIGS. 1-4 a hydraulic actuator 6 is provided which causes a toothed sector 62 of one piece with the switch to rotate by means of a rack 61. In the example in FIG. 5, the upper plate 46 has a portion in the form of a hexagonal nut 63 which can be used to rotate the switch with a spanner.

Experimental tests carried out by the Applicant have demonstrated that the stages of cooling and angular disengagement of the switch from the hot plate with rotation of the switch into the new angular position do not together require more than 90 seconds.

What is claimed is:

1. A cylindrical switch with at least one passage which opens on one lateral cylindrical surface of the switch, wherein the switch is capable of being tightly received within a cylindrical hole in a hot plate and selectively orientated in such a way as to angularly line up or offset the said passage with respect to at least two channels in the hot plate which open onto the hole, in order to selectively permit, interrupt or divert the flow of molten plastics material between the said channels, and wherein the switch incorporates a circuit for a cooling fluid.

2. A switch according to claim 1, wherein it is operatively coupled with control means to vary the angular orientation of the switch within the hole.

3. A switch according to claim 1, wherein the cooling circuit is a coil circuit comprising a succession of substantially vertical lengths formed within a main cylindrical body of the switch, where the vertical lengths are joined together by upper and lower lengths which are closed off respectively by terminal plates hermetically fixed to the main body.

4. A method for varying the connections between at least two channels of a hot plate to deliver molten plastics material to at least one injection nozzle, wherein in the plate said at least two channels open onto a cylindrical hole of given diameter in which a cylindrical switch with at least one passage which opens onto a lateral cylindrical surface of the switch is immobilised by radial interference, comprising the following steps:

a) cooling the switch by causing a cooling fluid to circulate in a cooling circuit within the switch, at the same time keeping the plate in a heated condition, as a result of which the switch contracts canceling out or reducing the radial interference with respect to the hole, b) selectively rotating the switch in the hole in such a way as to bring the passage in the switch into a different angular position which is angularly in line with or offset from the said channels in the hot plate, c) interrupting the circulation of cooling fluid, allowing the switch to expand thermally and remain immobilised by radial interference in the hole in the plate in the angular position reached.

5. A method according to claim 4, wherein the switch is selected in such a way that its cylindrical surface has an outside diameter which is slightly greater than the inside diameter of the hole.

6. A method according to claim 5, wherein in order to insert the switch into the hole the steps a)- to c) are preceded by the steps of heating the hot plate, thereby thermally expanding the hole in such a way that its inside diameter is greater than the outside diameter of the cylindrical surface of the switch, inserting the switch in the hole, and allowing the plate to cool, as a result of which the hole contracts around the cylindrical surface and the switch is firmly immobilised in the hole through radial interference.

* * * * *